United States Patent [19]

Muller et al.

[11] 4,175,298

[45] Nov. 27, 1979

[54] HANDLE FOR FREE-CUTTING DEVICES

[75] Inventors: Erich Müller, Waiblingen; Joachim Kottke, Neckargröningen, both of Fed. Rep. of Germany

[73] Assignee: Andreas Stihl, Waiblingen, Fed. Rep. of Germany

[21] Appl. No.: 879,485

[22] Filed: Feb. 21, 1978

Related U.S. Application Data

[63] Continuation-in-part of Ser. No. 724,972, Sep. 20, 1976, abandoned.

[30] Foreign Application Priority Data

Sep. 18, 1975 [DE] Fed. Rep. of Germany ....... 7529517

[51] Int. Cl.² ............................ B25F 1/00; B26B 7/00
[52] U.S. Cl. ........................................... 7/138; 30/276
[58] Field of Search ................. 30/276, 298, 340, 347; 7/138

[56] References Cited

U.S. PATENT DOCUMENTS

| | | | |
|---|---|---|---|
| 1,116,995 | 11/1914 | Casteran | 30/276 |
| 3,453,732 | 7/1969 | Wilkin | 30/276 X |
| 4,006,528 | 2/1977 | Katsuya | 30/276 |

*Primary Examiner*—James G. Smith
*Attorney, Agent, or Firm*—Becker & Becker, Inc.

[57] ABSTRACT

A handle for free-cutting devices which includes a handle member provided with holding elements, a clamping device for detachably connecting the handle member to the handle, and a carrier for a shank carrying the cutting tool of the free-cutting device. The clamping device is arranged on the carrier. At least one portion of the clamping device together with the handle member is pivotable relative to the carrier and is arrestable in at least two positions.

19 Claims, 5 Drawing Figures

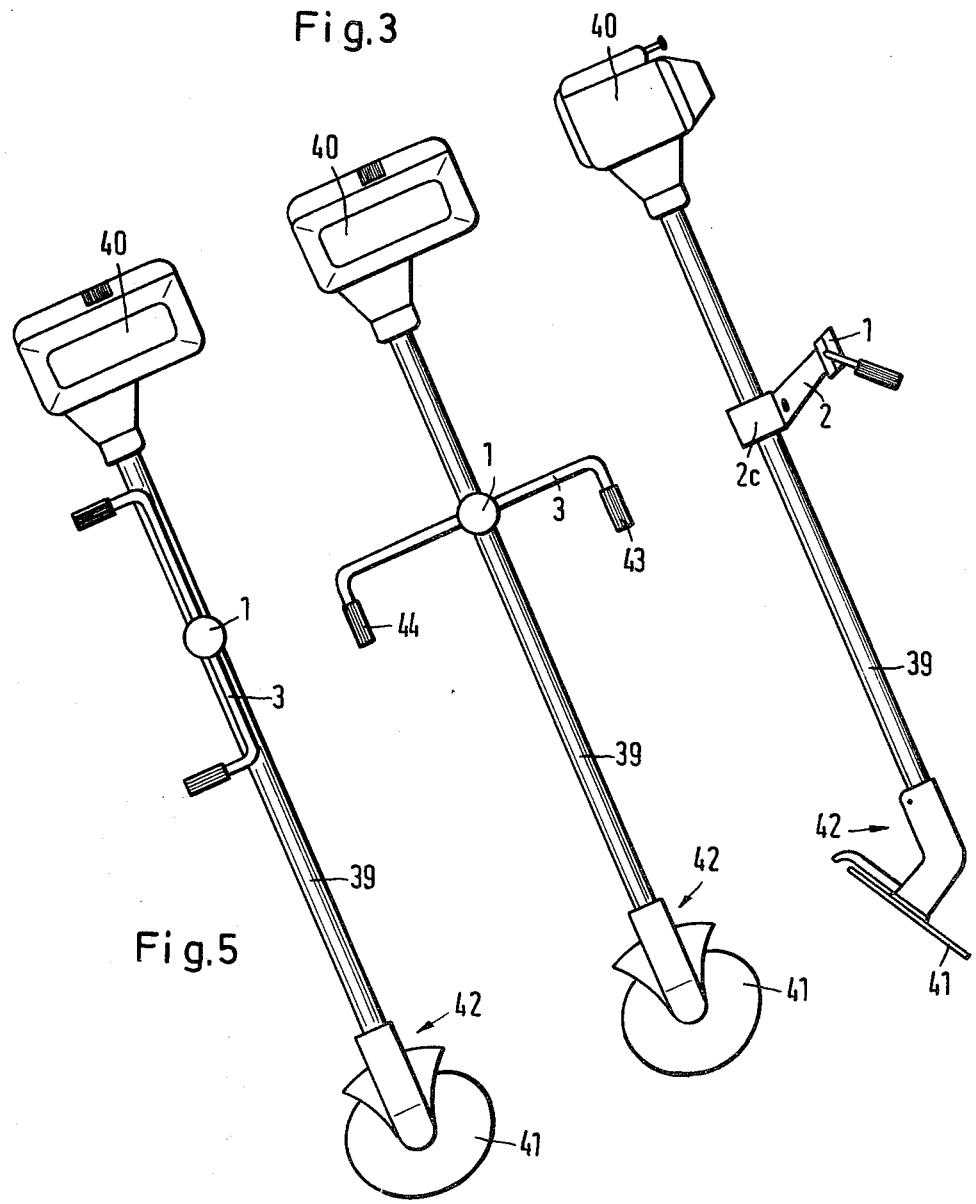

HANDLE FOR FREE-CUTTING DEVICES

This is a continuation-in-part of co-pending application Ser. No. 724,972—Müller, et al filed Sept. 20, 1976 (Monday), now abandoned.

The present invention relates to a handle for free-cutting devices with a handle pipe which is provided with holding members, with the clamping device by means of which the handle pipe can be detachable fastened, and with a carrier member provided for a handle which carries the cutting tool of the free-cutting device, said clamping device being arranged on said carrier.

With a heretofore known handle of the type involved, the carrier for the handle of the free-cutting device is designed in the form of a housing and comprises a trough-shaped depression for the handle pipe which depression is provided at the upper side of said carrier. The clamping device for this handle pipe is formed by this portion of the carrier and by a trough-shaped clamping member which for purposes of clamping the handle pipe located in the depression of the carrier is placed on said handle pipe and by means of screws is connected to said carrier. The clamped fast handle pipe extends perpendicularly to the handle which has the free-cutting device connected to one end thereof.

The handle pipe is relatively long and therefore in view of its location perpendicular to the handle of the free-cutting device impeded the transport of the free-cutting device. When working for instance in forests, the free-cutting device is transported around on the shoulder or in the hand. Under these circumstances, the free-cutting device can by means of its protruding handle pipe easily become caught in the branches or bushes whereby the transport is considerably impeded. The handle pipe extending parallel to the handle, however, not only when being transported during working but also when transporting the free-cutting device by motor vehicle impedes the transport. The free-cutting device takes up a considerable space and can only under difficulties be stowed in the vehicle. For mailing, the location of the handle pipe is likewise disadvantageous. Therefore, the free-cutting device cannot be completely assembled with the handle pipe and be dispatched but has to be mounted by the buyer after it has been received.

It is, therefore, an object of the present invention to provide a handle of the above mentioned type for the free-cutting device which can without difficulties be transported and can be dispatched in fully assembled condition.

These and other objects and advantages of the invention will appear more clearly from the following specification in connection with the accompanying drawings, in which:

FIG. 3 is a schematic illustration in a plan view upon a free-cutting device having a handle in accordance with the present invention.

FIG. 4 is a side view of the free-cutting device of FIG. 3.

FIG. 5 is a plan view upon the free-cutting device with which the handle pipe is in transporting position.

The handle for free-cutting devices according to the present invention is characterized primarily in that it leaves one portion of the clamping devices together with the handle pipe pivotable relative to the carrier 2 and can be arrested in at least two positions.

Figure 1:
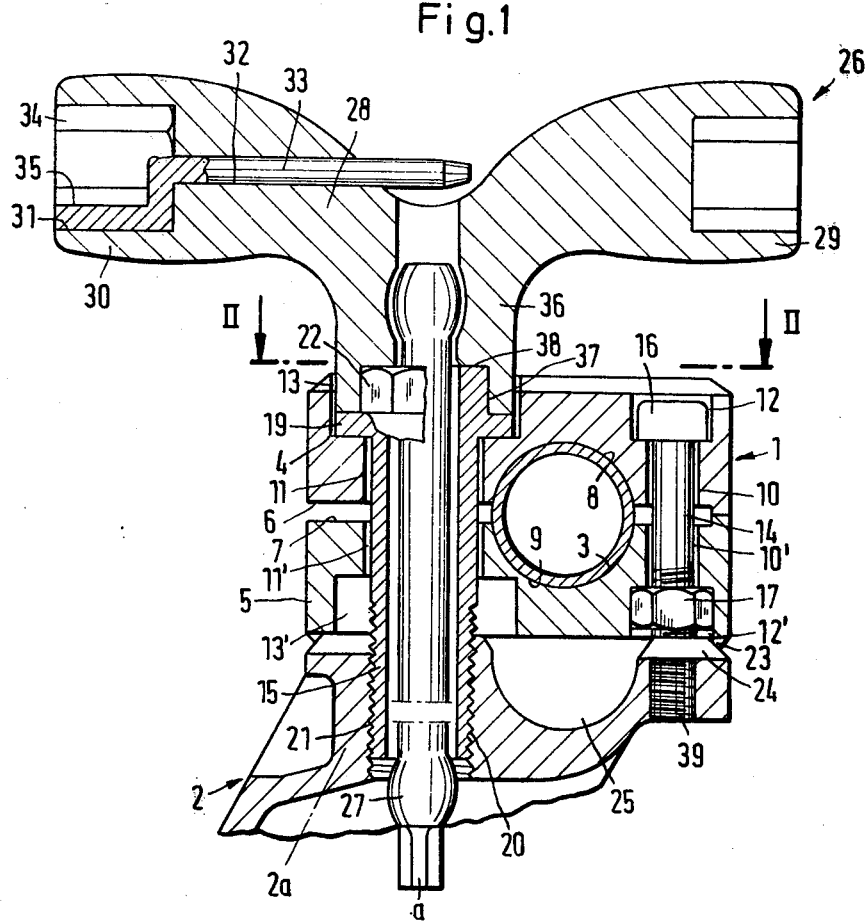
FIG. 1 illustrates a section through the handle according to the invention.
Figure 2:
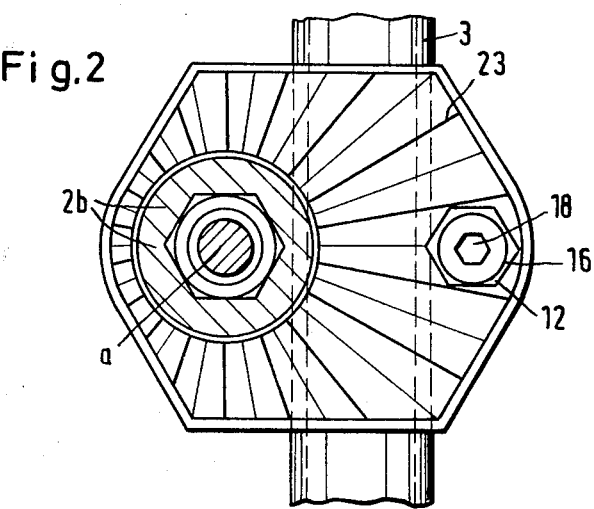
FIG. 2 is a section taken along the line II—II of FIG. 1.

Referring now to the drawings in detail, the handle according to the present invention comprises primarily a clamping device 1, a carrier 2 for the free-cutting device, and the handle bar 3. The carrier 2 at one end thereof has a holding part 2c which substantially completely surrounds a shank 39 of the free-cutting device and upon which the same is held. A drive motor 40 is seated upon one end of the shank 39; the motor drives a disc-formed cutting tool 41 of a cutting head 42 by way of a drive shaft guided through the shank. The cutting head 42 is fastened to the lower end of the shank. The cutting tool 41 rotates about an axis lying at an incline to the longitudinal axis of the shank 39 (FIG. 4). The clamping device 1 has two clamping jaws 4 and 5 which at their sides 6 and 7 which face each other are provided respectively with a depression or recess 8 and 9 which recess has a semi-circular cross section and extends over the entire width of the clamping jaws 4 and 5. The radius of curvature of the two recesses 8 and 9 is so selected that the handle bar or pipe 3 located in these depressions engages over its entire circumference the wall of said depressions and thereby is safely supported. At both sides of the depressions 8 and 9, a passage 10, 11 and 10', 11' is respectively provided in each clamping jaw 4 and 5. The passage openings have a circular cross section and at those sides of the clamping jaws 4 and 5 which face away from each other respectively load into the bottom of a depression 12, 13 and 12', 13'. The depressions 12, 13 and 12', 13' which are located at those sides of the clamping jaws 4 and 5 which face away from each other have a diameter greater than the pertaining passage openings 11, 12, and 11', 12'. As indicated in FIGS. 1 and 2, the passage openings extend perpendicular to the handle pipe 3.

When the clamping jaws 4 and 5 are placed one upon the other, the passage openings 10, 11 and 10', 11' are aligned with each other and serve for receiving clamping screws 14 and 15 by means of which the clamping jaws 4 and 5 can be clamped against each other for holding the handle pipe 3. The clamping screw 14 of smaller diameter has its head 16 located completely within the depression 12 and is screwed into a hexagonal nut 17 which is likewise completely located or arranged in the depression 12' of the other clamping jaw 5. Thus, the clamping screw 14 does not project beyond the top side of the clamping device 1 so that the user when working with a free-cutting device with a handle according to the present invention cannot hurt himself on protruding screw heads or nuts. In order to permit a tightening with this screw 14, the hexagonal nut 17 engages by means of at least two oppositely located lateral surfaces the wall of the depression 12' so that the nut will not be turned when tightening the screw. For tightening the screw 14, an inner hexagonal recess 18 is provided in the screw head 16.

The clamping screw 15 which is provided on that side of the handle 3 which is located opposite the clamping screw 14 is designed as a clamping sleeve which similar to the clamping screw 14 of shorter diameter is with slight play guided in the passage openings 11 and 11' of the two clamping jaws 4 and 5. The tightening or clamping sleeve has one flange 19 resting on the bottom of the depression 13 of the upper clamping jaw 4 and has its other end which is provided with a thread 20 projecting beyond the depression 13' of the lower clamping jaw 5 up to and into a threaded bore 21 provided in the carrier 2. That end portion 22 of the clamping sleeve 15 which is located above the flange 19 is designed as a hexagon and only slightly projects from the depression 13 of the clamping jaw 4. The clamping screws 14, 15 which are respectively provided on both sides of the handle pipe 3 assure a fast holding of the handle pipe in the clamping device 1. When the clamping jaws 4 and 5 occupy the clamping position illustrated in FIG. 1, they are located within the region of the clamping screw 14 which has a smaller diameter, whereas within the region of the clamping sleeve 15 they are shaped by a shorter distance from each other. In this way, it will be assured that the handle pipe 3 is firmly clamped between the two clamping jaws and cannot accidentally turn even after the free-cutting device has been used for a longer period of time. For purposes of clamping in the handle pipe, the tightening screw 14 is tightened by means of a wrench which corresponds to the inner hexagon 18 of the screw head 16. In this way, the handle pipe is preliminarily held in the desired position within the two depressions 8 and 9. In view of the inner hexagon 18, the depression 12 in the upper clamping jaw 4 may be relatively small. The final clamping fast of the handle 3 between the two clamping jaws is effected by means of the clamping sleeve 15. Clamping sleeve 15 is passed through the aligned openings 11 and 11' of the two clamping jaws, and is screwed into the threaded bore 21 provided in the carrier 2. As a result thereof, the carrier 2 is pressed against the clamping device 1, and at the same time the two clamping jaws 4 and 5 are within the region of the clamping sleeve 15 clamped against each other. In this way, an extremely safe fit of the handle pipe 3 is assured. If the handle pipe or bar 3 is in its clamping position, the carrier 2 firmly engages the bottom side of the clamping device 1.

In order to assure that, when working with a free-cutting device equipped with a handle according to the present invention, the relative position of clamping device 1 and carrier 2 relative to each other will not be changed, those sides of the clamping device and the carrier facing each other are respectively provided with axially protruding teeth 23 and 24. Inasmuch as the clamping device, in an advantageous manner comprises two identically designed clamping jaws, the teeth 23 are arranged not only on that side which faces the carrier 2 but also on that side of the clamping device which faces away from the carrier 2. The teeth 23 of the clamping device extends from the rim of the depressions 13 and 13' in radial direction of these depressions up to the rim of the clamping device (FIG. 2). In a corresponding manner, the teeth 24 extend at the top side of the carrier 2 from the rim of the threaded bore 21 in radial direction to the rim of the top side of the carrier 2. The teeth 23 and 24 hav (not illustrated) a somewhat trapezoidal cross section. It will be assured in a simple manner that an accidental turning of the carrier 2 relative to the clamping device 1 will be safely prevented inasmuch as the teeth extend up to the rim of the clamping device and of the carrier respectively, also large forces can be absorbed which approximately tagentially act upon the clamping sleeve 15. When the handle occupies its working position, the handle pipe 3 (FIGS. 3 and 4) occupies a position approximately perpendicular to the handle for the respective free-cutting device. For purposes of transporting the free-cutting device, the clamping sleeve 15 is by means of a corresponding wrench screwed out of the threaded bore 21 of the carrier 2 to such an extent that the teeth 23 and 24 are completely disengaged from each other, and the carrier 2 can be pivoted relative to the clamping device 1 into a transporting position in which the handle pipe 3 extends approximately parallel to the shank 39 of handle of the freecutting device (FIG. 5). After the carrier 2 has been pivoted into the respective position, it is merely necessary to screw the clamping sleeve 15 back into the threaded bore 21 of the carrier. During the pivoting of the carrier 2, the clamping screw 14 which for purposes of an adjustment does not have to be loosened, prevents the handle pipe 3 from an accidental turning about its axis or from an accidental displacement in its longitudinal direction, so that the handle pipe will retain its once adjusted position relative to the clamping device 1.

Also for adjusting the handle pipe 3 with regard to the clamping device 1, the clamping sleeve 15 is slightly loosened so that the handle pipe can be turned or displaced. In this way, the position of the handle pipe and the holding parts 43, 44 at the ends of said handle pipe can be adapted to the respective operations and to the respective terrain. The holding parts 43, 44 of the handle pipe 3 are located approximately at right angles to the remaining part of the handle pipe.

In view of the multiplicity of teeth 23 and 24, the carrier 2 can be adjusted so as to occupy a plurality of positions relative to the clamping device 1. As a result thereof, an optimum position of the carrier 2 relative to the clamping device will be assured so that any work which can be carried out by a free-cutting device can easily and in a simple manner be effected.

Instead of the teeth 23 and 24, it is possible also to provide the clamping device with a pin 2a (diagrammatically illustrated only) which projects in the direction toward the carrier and which engages one of a plurality of openings 2b (likewise diagrammatically illustrated only) which are provided in the carrier. These openings are located along a circle around the axis a of the threaded bore 21 or of the passage openings 11 and 11' which axis a forms the pivot axis for the carrier 2 and the clamping device 1. After the clamping sleeve 15 has been loosened and after the pivot has become disengaged from the respective opening, the carrier can again be pivoted relative to the clamping device and can be arrested in a new position where the pivot of the clamping device engages a new opening in the carrier 2. Also in this way, an adjustment of the handle pipe 3 with regard to the handle of the free-cutting device is possible. In particular, the handle pipe can again be pivoted into a transport position in which it extends approximately parallel to the shank. As will be evident from FIG. 1, a semicircular depression 25 is provided in the carrier 2, which depression is designed in the same way as the depression 9 in the clamping jaw 5. As a result thereof it is possible to clamp the handle bar or pipe 3 not only between the two clamping jaws 4 and 5 but also between the clamping jaw 4 and the carrier 2 proper. For the clamping screw 14 there is provided a passage opening 39 located on a protruding portion of the carrier 2. In this instance, the second clamping jaw 5 is not necessary. With this arrangement, however, it is necessary that for purposes of pivoting the carrier 2, the clamping sleeve 15 has to perform a greater adjusting stroke because the carrier can be pivoted only when the handle bar or pipe 3 is completely withdrawn from the depression 25 of the carrier 2. With the above preferred embodiment, this adjustment is less, because the clamping sleeve need be loosened only to such an extent that the teeth 23 and 24 are slightly spaced from each other.

In the clamping sleeve 15 there may be provided an assembly wrench 26 which has an approximately T-shaped form and includes a screw driver 27 which is arranged in the clamping sleeve 15 and projects from the latter in the downward direction. The upper end of screw driver 27 is connected in an intermediate member 28 which comprises two pipe socket wrenches 29 and 30 extending in opposite direction with each other. These two wrenches 29 and 30 have different wrench gauges. The inner hexagon 31 of the wrench 30 merges with a passage 32 into which a further screw driver 33 can be inserted. This screw driver 33 merges at one end into an extension 34 which has an outer circumference corresponding to the inner hexagon 31 of the wrench 30 and positively engages the wall of the inner hexagon 31. This extension member 34 likewise has an inner hexagon 35. By inserting the screw driver 33 into the wrench 30 it will be possible in a simple manner to vary the wrench gauge of the socket wrench 30. In this way, the assembly wrench 26 can be used for a greater number of different screw sizes.

The intermediate member 28 which interconnects the two pipe wrenches 29 and 30 merges with an extension 36 which surrounds the screw driver 27 with considerable play. According to the specific example shown in the drawing, this extension 36 has a circumference and is provided with an inner hexagon 37 by means of which the assembly wrench 26 can be placed upon the clamping sleeve 15 for tightening or loosening the same. By means of the assembly wrench 26, the clamping sleeve 15 can be loosened, withdrawn, and tightened in a simple manner. Inasmuch as the assembly wrench 26 has its extension member 36 resting on the flange 19 of the clamping sleeve 15, a safe guiding of the assembly wrench will be assured. This guiding will be further improved by the fact that the bottom 38 of the inner hexagon 37 rests on the end portion 22 of the clamping sleeve 15. The assembly wrench 26 is by means of its screw driver 27 safely mounted in the clamping sleeve 15 so that it does not have to be removed when working with the free-cutting device according to the invention. This has the advantage on one hand that an adjustment of the carrier 2 and the handle pipe 3 can be carried out in a simple manner. On the other hand, the assembly wrench 26 does not have to be carried along in a separate pocket or the like. Due to the different wrench gauges of the socket wrench, the assembly wrench 26 can also be employed for tightening or loosening other screws on the free-cutting device. Instead of the hexagonal end portion 22 of the clamping sleeve 15, the latter may at its upper end also be provided with an inner hexagon into which a correspondingly designed end portion of the assembly wrench 26 may be inserted. Also in this instance, a proper loosening and tightening of the clamping sleeve 15 will be possible.

In addition to the possibility of pivoting the handle pipe 3, the handle according to the invention may also be designed so as to be adjustable at an approximately right angle with regard to the handle which supports the cutting tool 40 of the free-cutting device. Due to this adjustment in height, the position of the handle can with regard to the stem or shank be adapted to the different size of the respective operator.

As will be evident from the above, due to the design of the handle according to the invention, the free-cutting device can be transported and mailed without difficulties. The handle pipe can from its working position in which it extends about vertically with regard to the shank of the free-cutting device, be pivoted into a transport position and can be arrested in the latter in which the handle pipe is about parallel to the shank. For purposes of transporting the device, the handle pipe is pivoted into said transport position so that the free-cutting device can in a simple manner and without the danger of getting stuck on branches or bushes be transported by the operator. Also, when the free-cutting device is to be transported in a vehicle, the handle pipe has merely to be pivoted into the advantageous transport position in which it requires a minimum of space. A further advantage of the handle according to the invention consists in that the free-cutting device can be dispatched in a fully mounted position. While it is being dispatched, the handle pipe occupies said transport position so that the free-cutting device will have a form which is more suitable for mailing or the like. The buyer will then merely have to pivot the handle pipe from its transport position into its working position.

The following statements should clarify the advantages of a pivotable handle arrangement and the basic construction of a free-cutting device. FIGS. 1-3 illustrate free-cutting devices. As recognizable from these illustrations, the handle described with the present disclosure is journalled on a carrier (pipe or tube) which at one end carries the drive motor 2a and at the other end carries the cutting tool 3b. There should be clear how a free-cutting device is embodied. FIGS. 1-3 are to illustrate construction of a free-cutting device. There is emphasized, however, that in the present application only the device with handle for such a free-cutting device is to be protected.

Individual features concern description of how work is done with a free-cutting device and how the handle can be adjusted. The following paragraphs set forth brief statements concerning the individual features:

This concern includes the feature of how the free-cutting device is transported in terrain. The handle strut is so arranged on the carrier or beam of a free-cutting device that both handle shells are directed upwardly. A danger exists therewith that the carrier or beam can become snarred in branches during transporting thereof in a forest. This situation is set forth in the introductory paragraphs of the disclosure. This situation results with the free-cutting device as known prior to the present disclosure with which the handle carrier or pipe cannot be pivoted with respect to the carrier or pipe.

A pivot strut is now capable of being turned and has flapped downwardly in accordance with features of the present invention. There is apparent the capability of being clearly that in this position the danger of becoming snagged in branches is considerably reduced. This pivoting and downward flapping is possible with the present inventive handle.

As a consequence of the capability of pivoting the handle tube of the inventive handle, the free-cutting device can be carried for transporting also in the hand (carry like a piece of luggage or trunk).

The possibilities in accordance with the present invention are not provided with the previously known handles for free-cutting devices because there the handle pipe or tube is not pivotable with respect to the carrier.

Another working position is possible when work is done downgrade or downhill (hanging down).

Another working position is possible when work is being done uphill with the free-cutting device (upwardly).

There is recognizable that the operator car work in an upright position with stretched arm positioning independently thereof as to which position the free-cutting device itself occupies with respect to the body of the operator. This is attained through the pivot capability of the handle pipe or tube because thereby the handle pipe or tube can be matched or adapted to the work to be carried out respectively to the particular terrain. As a consequence of the capability of adjustment there can be conveniently carried out every work that is to be done in a simple and straight forward manner. The handle pipe or tube can be so adjusted that the particular operator can work conveniently and comfortably with the free-cutting device.

The assembly key 26 is not embodied integrally or in one piece with the clamping device 1 and the carrier 2, but rather is a separate construction part. As described in the present disclosure, the screwdriver 27 projects downwardly out of the tensioning or clamping sleeve 15. This has the advantage that in the screwdriver projecting downwardly out of the clamping sleeve, there can be hung or suspended a carbine or spring safety hook of the carrying belt.

In case of danger, for example during a fire or burning of the driver motor, there is necessary that the free-cutting device can be removed or taken off quickly from the carrier belt. This is very simply possible with the inventive handle thereby that the assembly key is withdrawn upwardly from the clamping sleeve whereby the carbine or spring safety hook momentarily is released or becomes free. In this manner the operator in an emergency can free himself very quickly from the free-cutting device.

With conventional carrier belt fastening, the carbine or spring safety hook of the carrier belt is hung or suspended in an eyelet provided on the stem or beam of the free-cutting device. In case of danger it is relatively difficult quickly to disconnect the carbine or spring safety hook from the eyelet.

As apparent, the capability of adjustment of the handle is purposeful because of the characteristics of the corresponding terrain where the device having the handle is used as well as in view of the size of the particular operator. Such capability of matching or adapting the handle to the work to be carried out respectively to the size of the operator cannot be realized with non-pivotable handles.

With the teaching of the present invention and that of the copending continuation-in-part application Ser. No. 876,933-Müller filed Feb. 10, 1978 based on U.S. Patent application Ser. No. 724,971—Müller, et al filed Sept. 20, 1976 (Monday), now abandoned, and belonging to the assignee of the present invention, there is to be protected a free-cutting device with which the connection between the carrier belt and the free-cutting device can be released momentarily without great force application. With the free-cutting device known prior to the German priority document filing date, the carrier belt is also suspended or hung with a carbine or spring safety hook into an eyelet provided on the stem or beam of the free-cutting device. The basic construction of the free-cutting device and the advantages of the pivotable handle arrangement have been set forth in detail. The holding stem projects with the screwdriver downwardly out of the handle part. The carbine or spring safety hook provided on the carrier belt is hung or suspended in the screwdriver. In case of danger, especially during fire or burning of the drive motor, there is necessary that the free-cutting device can be released quickly from the operator. This is possible in a simple manner with the inventive free-cutting device thereby that the holding stem is withdrawn upwardly from the handle part. Consequently, the carbine or spring safety hook momentarily is released or comes free and the free-cutting device is free from the operator.

In the previous conventional carrier belt fastening utilized up to the time of the filing date of the present disclosure, on the stem of the free-cutting device there is fastened a ring into which the carbine or spring safety hook is hung or suspended. In case of danger with this previously known embodiment, the carbine or spring safety hook must be opened so that the same can be disengaged from the rings. The releasing of this connection is particularly cumbersome particularly in case of danger when such releasing is to occur very quickly. There must be taken into consideration therewith that the ring hangs in the carbine or spring safety hook with the entire weight of the free-cutting device, so that a considerable exertion of force is necessary in order to release the connection.

These disadvantages do not arise with the present inventive embodiment. The holding stem only needs to be withdrawn from the handle part and for this purpose no greater exertion of force is required. The carbine or spring safety hook itself need not be opened because the hook is released or is free automatically from the screwdriver a during withdrawal of the holding stem.

In accordance with the present invention and that of the copending continuation-in-part application of U.S. Ser. No. 876,933—Müller filed Feb. 10, 1978, the holding stem is advantageously embodied as a tool as for example a screw key. The arrangement of the holding stem 26 is positively necessary and required because otherwise the carrier belt could not be hung or suspended in the free-cutting device. It is not important that the holding part is a tool. The holding part must only be so embodied that the carbine or spring safety hook can be easily hung or suspended and can be quickly released. The embodiment of the holding part as a tool, for example as a screw key, represents only a preferred sample embodiment because then the holding part simultaneously can be used for changing or interchanging the cutting head or for adjusting the handle tube or pipe.

FIGS. 1–4 inclusive, illustrate features of the present invention. FIG. 2 illustrates the structural connection of the handle part with the drive motor 2a, the shank 1a and the cutting head 3a. The part is held upon the shank with the sleeve 2b of the carrier 2. The supporting strap 42 is guided over the shoulder of operating personnel.

It is, of course, to be understood that the present invention is, by no means, limited to the specific showing in the drawing, but also comprises any modifications within the scope of the appended claims.

What we claim is:

1. A handle for a free-cutting device, which includes: a handle section comprising clamping means operable to receive and clamp therebetween handle bar means so that the latter project from both sides of said clamping means, carrier means supported by said handle section for carrying a free-cutting device, and means included cooperative with said clamping means and said carrier means for selectively permitting pivoting of that portion of said clamping means which is adapted to receive and clamp said handle bar means therebetween relative to said carrier means and to arrest said portion of said clamping means in at least two positions.

2. A handle according to claim 1, in which said means included cooperative with said clamping means includes a tensioning connection for selectively locking said handle section and said carrier means together and unlocking the same from each other.

3. A handle according to claim 2, in which said tensioning connection includes a clamping screw supported by and extending through said clamping means and threadedly engaging said carrier means, and in which said clamping screw has a polygonal head with at least one side thereof in engagement with the outside of said clamping means, the longitudinal axis of said clamping screw forming the pivot axis of that portion of said clamping means which is adapted to receive and clamp said handle bar means.

4. A handle according to claim 1, in which said carrier means engages said clamping means.

5. A handle according to claim 3, in which said clamping means includes two clamping jaws each having an end face and a trough-shaped section with one trough-shaped section facing the other one for receiving said handle bar means, said trough-shaped sections having their longitudinal axes extending in a direction perpendicular to the direction in which the longitudinal axis of said clamping screw extends.

6. A handle according to claim 5, which includes screw bolt means having a head and being substantially parallel to said clamping screw while extending through said clamping jaws and being provided with corresponding nut means, and in which said screw bolt means and said clamping screw are respectively arranged on opposite sides of said trough-shaped sections.

7. A handle according to claim 6, in which that one end face of one clamping jaw which faces away from the other end face of the other clamping jaw is provided with two cavities spaced from each other for respectively receiving said head of said screw bolt means and said head of said clamping screw, the end face of said other clamping jaw having a cavity in axial alignment with said screw bolt means for receiving said nut means.

8. A handle according to claim 6, in which said head of said screw bolt means has an inner polygonal face.

9. A handle according to claim 7, in which that end face of said other jaw and the carrier face facing said other jaw have teeth adapted to intermesh when said other jaw and the carrier facing the latter engage each other.

10. A handle according to claim 9, in which said teeth of said other jaw and of said carrier face facing said other jaw radially extend in the planes of said carrier face and of the adjacent face of said other jaw with the center of said radial extension of said teeth being located substantially on the axis of said clamping screw.

11. A handle according to claim 10, in which the teeth of said carrier means extend from the threaded engagement of said carrier means by said clamping screw up to the rim of said carrier means.

12. A handle according to claim 1, in which said means included cooperative with said clamping means and said carrier means respectively include pin means carried by the clamping jaw adjacent said carrier means and at least two depressions in the adjacent face of said carrier means for selectively receiving said pin means to arrest said carrier means relative to said clamping means in either one of two positions corresponding to the location of said at least two depressions.

13. A handle according to claim 3, which includes an assembly wrench, and in which the clamping screw has an axially extending cavity for removably housing said assembly wrench for tightening and loosening said clamping screw.

14. A handle according to claim 13, in which said wrench is a T-shaped assembly wrench having a stem and two oppositely located arms, said stem and arms respectively forming socket wrenches for differently gauged screw heads.

15. A handle according to claim 14, which includes a screw driver removably arranged in said socket wrench formed by said stem, said screw driver protruding from said last mentioned socket wrench and being operable to mount said assembly wrench in said clamping screw.

16. A handle according to claim 14, which includes an additional screw driver removably arranged in another one of said socket wrenches.

17. A handle according to claim 16, in which one end of said additional screw driver forms a tubular socket wrench having its outer wall in engagement with the pertaining socket wrench of said assembly wrench.

18. A handle according to claim 4, in which that side of said carrier means which engages said clamping means is provided with a semi-circular depression and a passage.

19. A handle according to claim 1, in which said handle bar means is adjustable about perpendicularly to the stem of the free-cutting device to be carried by said carrier means.

* * * * *